(12) United States Patent
Zhang et al.

(10) Patent No.: US 12,021,787 B2
(45) Date of Patent: Jun. 25, 2024

(54) CONTROL METHOD FOR USER EQUIPMENT, AND USER EQUIPMENT

(71) Applicant: SHARP KABUSHIKI KAISHA, Sakai (JP)

(72) Inventors: Chongming Zhang, Shanghai (CN); Renmao Liu, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 344 days.

(21) Appl. No.: 17/631,391

(22) PCT Filed: Aug. 4, 2020

(86) PCT No.: PCT/CN2020/106764
§ 371 (c)(1),
(2) Date: Jan. 28, 2022

(87) PCT Pub. No.: WO2021/023177
PCT Pub. Date: Feb. 11, 2021

(65) Prior Publication Data
US 2022/0337378 A1 Oct. 20, 2022

(30) Foreign Application Priority Data
Aug. 5, 2019 (CN) .......................... 201910719456.6

(51) Int. Cl.
*H04L 5/00* (2006.01)
*H04W 72/20* (2023.01)
(Continued)

(52) U.S. Cl.
CPC ........... *H04L 5/0057* (2013.01); *H04W 72/20* (2023.01); *H04W 72/569* (2023.01); *H04W 4/40* (2018.02)

(58) Field of Classification Search
CPC ... H04L 5/0057; H04L 5/0048; H04L 5/0053; H04L 1/06; H04L 1/0693; H04W 72/20;
(Continued)

(56) References Cited

U.S. PATENT DOCUMENTS

| | | | |
|---|---|---|---|
| 2023/0269728 A1* | 8/2023 | Jaegal | G08G 1/0968 370/329 |
| 2024/0022356 A1* | 1/2024 | Lee | H04L 1/1896 |
| 2024/0032058 A1* | 1/2024 | Lee | H04W 72/25 |

OTHER PUBLICATIONS

Ericsson, "MAC miscellaneous issues", R2-2000950, 3GPP TSG-RAN WG2 #109-e, Electronic Meeting, Feb. 24-Mar. 6, 2020.
(Continued)

*Primary Examiner* — Hashim S Bhatti
(74) *Attorney, Agent, or Firm* — ScienBiziP, P.C.

(57) ABSTRACT

Provided in the present invention are a control method for user equipment, and user equipment. The control method for user equipment (UE) comprises: receiving, by the UE, a channel state information (CSI) request transmitted by other UE; generating, by the UE, on the basis of the CSI request, a CSI report transmitted through a PSSCH, and sidelink control information (SCI) for scheduling and indicating the transmission of the PSSCH; and setting, on the basis of whether the PSSCH carries a MAC protocol data unit (MAC PDU), a quality of service (QoS) parameter related to the QoS of the PSSCH transmission included in the SCI.

3 Claims, 3 Drawing Sheets

(51) Int. Cl.
*H04W 72/566* (2023.01)
*H04W 4/40* (2018.01)

(58) Field of Classification Search
CPC ..... H04W 72/569; H04W 4/40; H04W 24/10; H04W 72/1263; H04W 76/14; H04W 80/02; H04W 92/18
See application file for complete search history.

(56) References Cited

OTHER PUBLICATIONS

CATT, "MAC Open Issues", R2-2000205, 3GPP TSG-RAN WG2 Meeting #109-e, Electronic meeting, Feb. 24-Mar. 6, 2020.

* cited by examiner

CONTROL METHOD FOR USER EQUIPMENT, AND USER EQUIPMENT

TECHNICAL FIELD

The present invention relates to the technical field of wireless communications. More specifically, the present invention relates to a control method for user equipment and corresponding user equipment.

BACKGROUND

Vehicle to Everything (V2X) is a new generation of information and communication technology that connects vehicles with everything, in which V stands for vehicle, and X stands for any object that exchanges information with the vehicle, and X currently mainly includes vehicles, persons, traffic roadside infrastructure, and networks.

In a pair of UE performing V2X service communication, for example, UE A and UE B, in order to acquire link quality information, UE A may request UE B to report CSI (channel state information). Based on the CSI request, UE B will generate a corresponding CSI report, and transmit the CSI report to UE A. The CSI report is transmitted on a PSSCH, and may be carried on the PSSCH in the manner of puncher encoding, and a MAC PDU (MAC protocol data unit) may or may not be transmitted on the PSSCH. The CSI report may also be carried in a MAC CE (MAC control element), and then the MAC CE is encapsulated into a MAC PDU and transmitted through the PSSCH.

The transmission of the PSSCH in PC5 communication is scheduled and indicated by SCI (sidelink control information). The SCI indicates time-domain and frequency-domain information of the PSSCH transmission scheduled thereby, and also indicates information related to the QoS (quality of service) of the PSSCH transmission, such as priority, latency, reliability, etc. According to the information transmitted on the PSSCH, the problem to be solved is how to set the corresponding QoS-related information in the SCI.

In addition, when the PSSCH transmission conflicts with PUCCH or PUSCH transmission, determining which channel is to be preferentially transmitted is also an issue that needs to be solved.

SUMMARY

In order to address at least part of the aforementioned issues, provided in the present invention are a control method for user equipment, and user equipment.

According to a first aspect of the present invention, provided is a control method for user equipment (UE), comprising: receiving, by the UE, a channel state information (CSI) request transmitted by other UE; generating, by the UE, on the basis of the CSI request, a CSI report transmitted through a PSSCH and sidelink control information (SCI) for scheduling and indicating the transmission of the PSSCH; and setting, on the basis of whether the PSSCH carries a MAC protocol data unit (MAC PDU), a quality of service (QoS) parameter related the QoS of the PSSCH transmission included in the SCI.

In the above method, in the case where the PSSCH carries the MAC PDU, the QoS parameter may be set on the basis of the number of MAC service data units (MAC SDUs) included in the MAC PDU.

In the above method, in the case where the MAC PDU comprises one MAC SDU, the value of a QoS parameter corresponding to the MAC SDU may be used as the value of a QoS parameter corresponding to the MAC PDU; in the case where the MAC PDU comprises a plurality of MAC SDUs, the highest value or the lowest value among QoS parameters corresponding to the plurality of MAC SDUs may be used as the value of the QoS parameter corresponding to the MAC PDU; in the case where the MAC PDU does not comprise the MAC SDU, the QoS parameter corresponding to the MAC PDU may be set to a fixed value, or the value of the QoS parameter corresponding to the MAC PDU may be set on the basis of a specified parameter.

In the above method, in the case where the MAC PDU does not comprise the MAC SDU, the QoS parameter corresponding to the MAC PDU may be used as the QoS parameter included in the SCI carrying the CSI report.

In the above method, in the case where the PSSCH does not carry the MAC PDU, the value of the QoS parameter in the SCI may be set to a fixed value, or the value of the QoS parameter in the SCI may be set on the basis of a specified parameter.

In the above method, in the case where the PSSCH does not carry the MAC PDU, the SCI generated by the UE may not comprise or may omit information of the QoS parameter.

In the above method, the QoS parameter in the SCI may comprise a priority, latency, and reliability.

In the above method, the MAC PDU may comprise a MAC header and a padding bit, and in the case where a logical channel number or a logical channel number included in the MAC PDU corresponds to the padding bit, the QoS parameter corresponding to the MAC PDU is set to a fixed value, or the value of the QoS parameter corresponding to the MAC PDU is set on the basis of a specified parameter.

In the above method, the specified parameter is a priority threshold value.

According to a second aspect of the present invention, provided is user equipment, comprising: a processor; and a memory storing instructions, wherein the instructions, when run by the processor, perform the control method for user equipment described herein.

DETAILED DESCRIPTION

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

Prior to the specific description, several terms mentioned in the present invention are illustrated as follows. The terms involved in the present invention shall have the meanings set forth below, unless otherwise indicated.

UE: User Equipment
NR: New Radio
Sidelink

V2X: Vehicle to Everything
MAC: Medium Access Control
MAC CE: MAC Control Element
MAC PDU: MAC Protocol Data Unit
LCD: Logical Channel Identity
PDU: Protocol Data Unit
SDU: Service Data Unit
PSSCH: Physical Sidelink Shared Channel
PUSCH: Physical Uplink Shared Channel
PUCCH: Physical Uplink Control Channel
SCI: Sidelink Control Information
PSCCH: Physical Sidelink Control Channel
QoS: Quality of Service
SL-SCH: Sidelink Shared Channel
CSI: Channel State Information
CSI RS: CSI reference signalling The terms "associated", "corresponding", and "corresponding to" herein may be replaced with each other.

The two terms sidelink and V2X sidelink herein may interchangeable.

Figure 1:
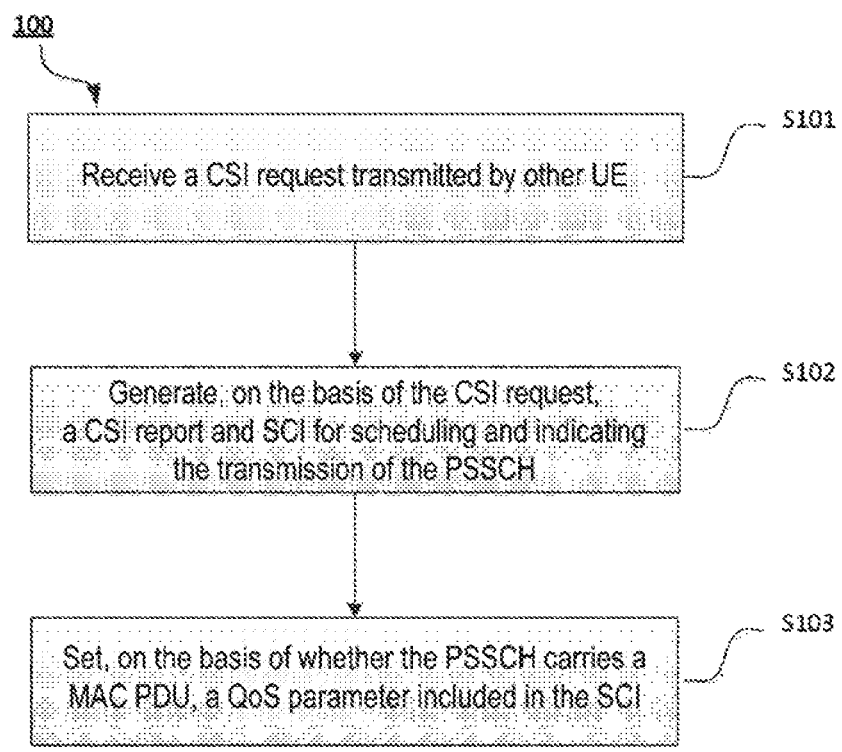
FIG. 1 shows a flowchart of a control method 100 for user equipment (UE) according to an embodiment of the present disclosure.

A control method for user equipment (UE) of the present invention is described below. Specifically, as an example, FIG. 1 shows a flowchart of a control method 100 for UE on the basis of an embodiment of the present disclosure.

In step S101, the UE receives a channel state information (CSI) request transmitted by other UE. Another implementation of step S101 may be that the UE receives configuration information, the configuration information is transmitted by other UE or transmitted by a base station and configures an instruction or request for the UE to perform periodic CSI reporting.

In step S102, the UE generates, on the basis of the received CSI request, a CSI report transmitted through a PSSCH and sidelink control information (SCI) for scheduling and indicating the transmission of the PSSCH.

In step S103, the UE sets, on the basis of whether the PSSCH carries a MAC protocol data unit (MAC PDU), a quality of service (QoS) parameter related to the QoS of the PSSCH transmission included in the SCI.

The QoS parameter included in the SCI may include, for example, a priority, latency, reliability, and the like.

Figure 2:
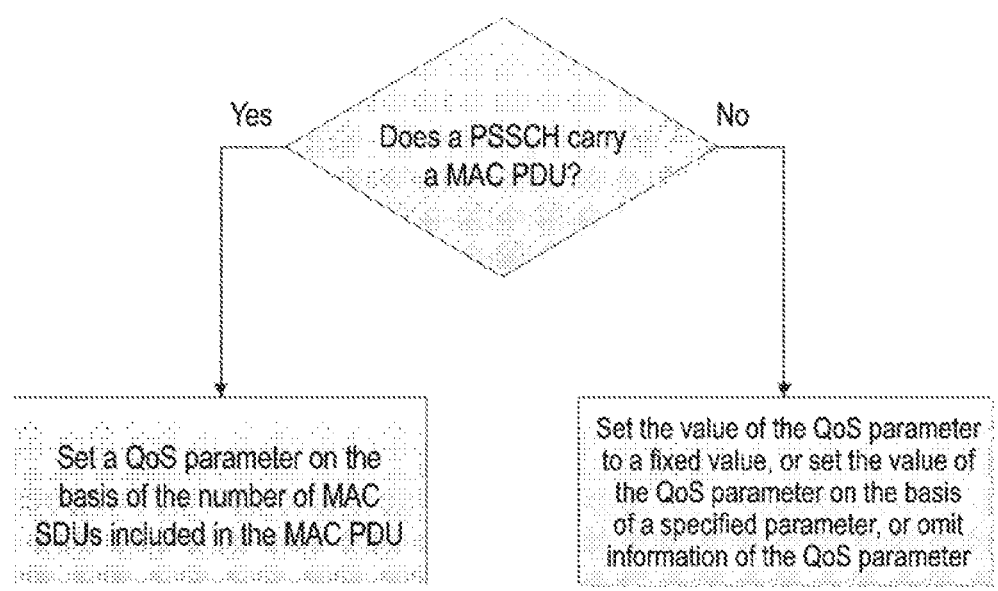
FIG. 2 shows a specific example of setting a QoS parameter included in SCI on the basis of whether a PSSCH carries a MAC PDU.

FIG. 2 shows a specific example of setting the QoS parameter included in the SCI on the basis of whether the PSSCH carries the MAC PDU.

For example, in the case where the PSSCH carries the MAC PDU, the QoS parameter may be set on the basis of the number of MAC SDUs included in the MAC PDU.

As an example, in the case where the MAC PDU includes one MAC SDU, the value of a QoS parameter corresponding to the MAC SDU is used as the value of a QoS parameter corresponding to the MAC PDU; in the case where the MAC PDU includes a plurality of MAC SDUs, the highest value or the lowest value among QoS parameters corresponding to the plurality of MAC SDUs is used as the value of the QoS parameter corresponding to the MAC PDU; in the case where the MAC PDU does not include the MAC SDU, the QoS parameter corresponding to the MAC PDU is set to a fixed value, or the value of the QoS parameter corresponding to the MAC PDU is set on the basis of a specified parameter.

In addition, for example, if the MAC PDU does not include the MAC SDU, the QoS parameter corresponding to the MAC PDU may also be used as the QoS parameter included in the SCI carrying the CSI report.

Furthermore, in the case where the PSSCH does not carry the MAC PDU, the value of the QoS parameter in the SCI may be set to a fixed value, or the value of the QoS parameter in the SCI may be set on the basis of a specified parameter, or information of the QoS parameter is not included or is omitted in the SCI.

Hereinafter, specific examples and embodiments related to the present invention are described in detail. In addition, as described above, the examples and embodiments described in the present disclosure are illustrative descriptions for facilitating understanding of the present invention, rather than limiting the present invention.

Embodiment 1

Embodiment 1 provides a method for determining a QoS parameter of a transport block. The transport block may at least include one MAC PDU. One MAC PDU may include zero or one or a plurality of MAC SDUs.

The MAC SDU includes service data transmitted from an upper layer, and service flows to which these service data belong have QoS requirements corresponding thereto, i.e., priority, latency, and reliability. These QoS-related parameters have corresponding values according to service types of or service characteristics of the data.

If the MAC PDU includes only one MAC SDU, the value of a QoS parameter corresponding to this MAC SDU may be used as the value of a QoS parameter corresponding to this MAC PDU, and in turn may be used as the value of the QoS parameter of the TB carrying this MAC PDU.

If the MAC PDU includes a plurality of MAC SDUs, and these MAC SDUs do not belong to the same service flow, then the values of QoS parameters corresponding to the SDUs may be different. In this case, the value of the highest (or lowest) priority in these MAC SDUs may be correspondingly used as the priority of the MAC PDU, or the value of the shortest (or longest) latency may be correspondingly used as the latency of the MAC PDU, or the value of the highest (or lowest) reliability requirement may be correspondingly used as the value of the reliability requirement of the MAC PDU. The value may be in turn used as the value of the QoS parameter of the TB carrying this MAC PDU. Another way to implement this procedure may be to determine the QoS parameter of the MAC PDU according to a QoS parameter of a logical channel. Since each MAC SDU has a logical channel corresponding thereto, the logical channel has a corresponding number/identification, which is referred to as a logical channel ID. Each configured logical channel has QoS parameters corresponding thereto, especially a priority parameter. The values of these parameters are pre-configured, which may be configured according to configuration information transmitted by a base station/network side to the UE, or may be pre-configured values. In this case, the value of the highest (or lowest) priority corresponding to the logical channel IDs to which these MAC SDUs belong may be correspondingly used as the priority of the MAC PDU, or the value of the shortest (or longest) latency may be correspondingly used as the value of the latency of the MAC PDU, or the value of the highest (or lowest) reliability requirement may be correspondingly used as the value of the reliability requirement of the MAC PDU. In turn, the value may be used as the value of the QoS parameter of the TB carrying this MAC PDU.

If the MAC PDU does not include the MAC SDU, then the MAC PDU may include only a MAC header and a padding bit, where the MAC header may include an SL-SCH subheader and a MAC subheader corresponding to the padding bit, or it is possible that the MAC PDU includes only a MAC header, a MAC CE, and/or a padding bit, where the MAC header may be an SL-SCH subheader and a MAC subheader corresponding to the MAC CE, or may be a MAC subheader corresponding to the padding bit. The SL-SCH subheader may carry address information of the MAC PDU, such as a destination ID and/or a source ID. A QoS parameter corresponding to such a MAC PDU may be set to a fixed value:

For example, when a priority is being set, if a value corresponding to the highest/lower priority is 0, then the priority of the MAC PDU is set to 0; when latency is being set, if a value corresponding to the shortest/longest latency is 1, then the shortest latency corresponding to the MAC PDU is set to 1; if the value of the highest/lowest level of reliability requirement is 8, then a reliability requirement corresponding to the MAC PDU is set to 8. In short, a fixed value may be set.

Such a fixed value may also be configured by a network side. The UE receives configuration information transmitted by the network side or a base station, where the configuration information indicates the value of a QoS parameter corresponding to a MAC PDU that does not include a MAC SDU; then the UE may set the value of a QoS parameter corresponding to such a MAC PDU on the basis of the configuration.

In addition, the parameter value may also be a preconfigured fixed value. The value of a corresponding QoS parameter may also be set on the basis of a certain parameter. For example, when the priority corresponding to the MAC PDU is being set, the priority may be set on the basis of a priority threshold value. The priority value may be set to be higher than or equal to the threshold value, or may be set to be lower than the priority threshold value.

The priority threshold value herein refers to a threshold value used to determine whether the transmitted data meets a threshold requirement: if a priority corresponding to the transmitted data is higher than the threshold value, then the data may be preferentially transmitted. The term "preferentially" herein is described in terms of a data packet transmitted over an air interface, i.e., a data packet transmitted by the UE to a gNB over a Uu interface. When there is a conflict between a resource used to transmit the air interface data packet and a resource used to transmit a V2X data packet, for example, there is an overlap in time domain resources, or there is an overlap in frequency domain resources, the UE may compare a priority corresponding to the V2X data packet for transmission with the aforementioned priority threshold value. If the priority corresponding to the data is higher than the threshold value, the UE transmits the V2X data packet; otherwise, when the priority is lower than the threshold, the UE preferentially transmits the air interface data packet.

Since a MAC subheader corresponding to a padding bit (or a MAC CE) will carry a logical channel ID used to identify that the logical channel ID corresponds the padding bit (or the MAC CE), for a MAC PDU, when a priority corresponding thereto is being determined, the priority may be determined according to a logical channel included in the MAC PDU.

One implementation of the above solution may be: for a MAC PDU, when a QoS parameter corresponding thereto is being determined, the QoS parameter may be determined according to the value of a QoS parameter corresponding to a logical channel included in the MAC PDU. Using priority as an example, when this MAC PDU includes a MAC SDU and a MAC CE (or a padding bit), then a logical channel to which the MAC SDU belongs has a priority value corresponding thereto, and the ID of a logical channel to which the MAC CE (or the padding bit) belongs is used to identify the MAC CE (or the padding bit). It can be considered that the priority value corresponding to such a logical channel may be determined according to the method described above, and in turn may be considered as a priority corresponding to the logical channel ID. Then the priority values of these logical channels (corresponding to the MAC SDU and corresponding to the MAC CE or the padding bit) are compared, and the greatest or smallest value is used as the value of a priority corresponding to the MAC PDU, which may be in turn used as the value of a priority corresponding to a TB including the MAC PDU.

For a MAC PDU, if the MAC PDU includes only one logical channel/logical channel number, and the logical channel/logical channel number included in the MAC PDU corresponds to or identifies a padding bit (or a MAC CE), then it may be considered or configured that the value of a QoS parameter corresponding to the MAC PDU is a fixed value or is set on the basis of a certain parameter. A specific setting method is as described above.

Embodiment 2

When PC5-based V2X communication is performed, in order to transmit a MAC PDU, UE generates SCI to indicate resource information of a PSSCH for transmitting the MAC PDU. This PSSCH may be referred to as a SCI-scheduled PSSCH. The MAC PDU is carried in a transport block (TB) transmitted on the PSSCH. The SCI further includes a QoS-related parameter corresponding to the transport block, such as a priority, latency, reliability, and the like. Since these parameters may be used by other UE to detect a channel occupancy rate, the parameters need to be carried in SCI.

When the SCI is generated, the UE needs to set the values of fields corresponding to these QoS-related parameters. One setting method may be that the UE, on the basis of the method described in Embodiment 1, determines the value of the QoS parameter corresponding to the TB, and then sets the value of the QoS parameter carried in the SCI to the value of the QoS parameter of the TB corresponding thereto. The TB corresponding to the SCI herein refers to the TB transmitted on the PSSCH scheduled by the SCI. The parameter value may also be set on the basis of the value of the QoS parameter corresponding to the TB corresponding thereto.

Embodiment 3

Embodiment 3 of the present invention will be described below. The difference between Embodiment 3 and Embodiment 2 is that the value of a corresponding QoS parameter of a MAC PDU is not a fixed value.

Using priority as an example, when UE receives a CSI request, the UE may generate a MAC PDU that does not include a MAC SDU, but includes only a MAC header and a padding bit, or includes only a MAC header, a MAC CE, and/or a padding bit. The UE may carry, in the manner of puncher encoding, a generated and requested CSI report (CSI for short) on a PSSCH for transmitting the MAC PDU.

Since the CSI request may be carried in the SCI, the SCI indicates a PSSCH transmission at the same time, and this MAC PDU is carried on the PSSCH. According to the method in embodiment 1, in the SCI carrying the CSI request, the value of a QoS parameter, such as a priority, included in the SCI may be determined by the value of a priority corresponding to the MAC PDU transmitted on this scheduled PSSCH, and may be set to be equal to the value of the priority corresponding to the MAC PDU. For example, if the value of the priority corresponding to the MAC PDU is X, then the value of a priority field included in the SCI carrying the CSI request may be set to X.

In this case, when the CSI report generated in response to the CSI request is carried on the PSSCH for transmission,
- if the MAC PDU transmitted on this PSSCH does not include a MAC SDU, then it can be considered that the value of the priority corresponding to the MAC PDU is X, and the priority value in the SCI of the PSSCH scheduled to carry the transmission of the MAC PDU is set to X. The so-called scheduling refers to indicating in the SCI resource information for PSSCH transmission.
- if the MAC PDU transmitted on this PSSCH includes a MAC SDU, then the value of the priority corresponding to the MAC PDU may be determined according to the MAC SDU in accordance with the method described in Embodiment 1, and in turn the value of the priority of a TB carrying the MAC PDU may be determined, and the priority in the SCI of the PSSCH may be set to be equal to the value of the priority of the transport block.

In the case where the indication information of the CSI request is not directly carried in the SCI, and the information indicating the presence of a CSI RS is indicated in the SCI instead, the CSI request may be implicitly indicated. When the UE receives the SCI indicating the CSI RS presence information, it may be considered as a type of CSI request, so as to generate a corresponding CSI report. In this case, it can be considered that the value X of the priority field indicated by the SCI carrying the CSI RS presence information may be used as the value of the priority field in the SCI that schedules the PSSCH carrying the CSI report, that is, the value of the priority field is set to X.

Embodiment 4

Embodiment 4 of the present invention will be described in detail below. In Embodiment 4, UE may transmit a CSI report on a PSSCH. SCI that schedules the PSSCH carrying the CSI report will carry an indication, indicating that the PSSCH scheduled thereby carries the CSI report. In this case, the PSSCH may not carry a MAC PDU or may not carry a TB.

When the SCI carries the indication indicating that the PSSCH scheduled thereby carries the CSI report, the UE may set the value of a QoS parameter in the SCI to a fixed value, or set the value of the QoS parameter to a fixed value on the basis of a certain parameter. The specific setting method is as described in Embodiment 1.

Another implementation method of the above solution may be: when the SCI carries the indication indicating that the PSSCH scheduled thereby carries the CSI report, then the UE may not include or may omit information of the QoS parameter in the SCI; when other UE reads/receives SCI which carries a CSI report indication, then the other UE may consider the value of a QoS parameter corresponding thereto to be a fixed value, or the value may be acquired on the basis of a certain parameter. The specific setting method is as described in Embodiment 1. For example, the value of a priority is always 0, the value of latency is always 1, and the value of reliability is always 8, and so on.

Embodiment 5

Embodiment 5 of the present invention will be described below. The difference between Embodiment 5 and Embodiment 4 is that UE may transmit a CSI RS (CSI reference signal) on a PSSCH. In this case, SCI that schedules the PSSCH carries an indication indicating that the PSSCH scheduled thereby carries the CSI RS. In this case, the PSSCH may not carry a MAC PDU or may not carry a TB.

When the SCI carries the indication indicating that the PSSCH scheduled thereby carries the CSI RS, then the UE may set the value of a QoS parameter in the SCI to a fixed value, or set the value of the QoS parameter to a fixed value on the basis of a certain parameter. The specific setting method is as described in Embodiment 1.

Another implementation method of the above solution may be:
when the SCI carries the indication indicating that the PSSCH scheduled thereby carries the CSI RS, then the UE may not include or may omit information of the QoS parameter in the SCI; when other UE reads/receives SCI which carries a CSI RS indication, then the other UE may consider the value of a QoS parameter corresponding thereto to be a fixed value, or the value may be acquired on the basis of a certain parameter. The specific setting method is as described in Embodiment 1. For example, the value of a priority is always 0, the value of latency is always 1, and the value of reliability is always 8, and so on.

Embodiment 6

Embodiment 2 and Embodiment 4 can be used in combination as Embodiment 6 of the present invention.

When SCI indicates that a PSSCH carries a CSI report, and the PSSCH scheduled thereby does not carry a MAC PDU/TB, Embodiment 4 can be adopted.

When the PSSCH indicated by the SCI carries the CSI report and the PSSCH scheduled thereby carries the MAC PDU, Embodiment 2 can be adopted.

Embodiment 7

Embodiment 2 and Embodiment 5 can be used in combination as Embodiment 7 of the present invention.

When SCI indicates that a PSSCH carries a CSI RS, and the PSSCH scheduled thereby does not carry a MAC PDU/TB, Embodiment 5 can be adopted.

When the SCI indicates that the PSSCH carries the CSI RS, and the PSSCH scheduled thereby carries the MAC PDU/TB, Embodiment 2 can be adopted.

Embodiment 8

Embodiment 8 of the present invention will be described in detail below. In Embodiment 1, it is mentioned how to determine which type of data packet needs to be preferentially transmitted when there is a conflict between a resource for transmitting an air interface data packet and a resource for transmitting a V2X data packet. Embodiment 8 introduces a conflict resolution scheme when the aforementioned conflict occurs.

The resource for transmitting the air interface data packet mainly refers to a PUCCH and a PUSCH, and the resource for transmitting the V2X data packet mainly refers to a PSSCH. Therefore, the issue can be considered to be how to determine which channel to be preferentially transmitted when a conflict occurs between transmission of the PUSCH/PUCCH and transmission of the PSSCH.

When the PSSCH carries a TB and the TB carries a MAC PDU, the priority of the MAC PDU carried by the TB may be determined according to the method in Embodiment 1, and in turn the priority is considered to correspond to (or equal to) the priority of the PSSCH transmission. Since the MAC PDU may not carry a MAC SDU, that is, does not carry service-related data, in this case, in order to determine which channel needs to be preferentially transmitted, it is necessary to clarify a priority corresponding to the MAC PDU.

In Embodiment 1 and Embodiment 3, a method for determining the priority of a MAC PDU that does not include a MAC SDU is provided, which can be applied herein. On the basis of this method, after UE has determined the priority of the MAC PDU, the UE can compare the priority of this MAC PDU with the aforementioned priority threshold value. If the priority of this MAC PDU is higher than (or lower than) the threshold value, then the MAC PDU will be preferentially transmitted; if the priority of this MAC PDU is lower than (or higher than) the threshold value, then the air interface data packet will be preferentially transmitted.

Since the transmission on the PSSCH may also not carry a TB, when a conflict occurs, the UE can determine the priority of the PSSCH transmission according to the method in Embodiment 4 or 5, that is, the priority of SCI determined by the method in Embodiment 4 or 5 may be used as the priority of the PSSCH transmission scheduled by the SCI. Furthermore, the UE may compare the determined priority with the aforementioned priority threshold value, and if the determined priority is higher (or lower) than the threshold value, then the PSSCH is preferentially transmitted; if the determined priority is lower (or higher) than the threshold value, then the air interface data packet (PUSCH/PUCCH) is preferentially transmitted.

Embodiment 9

Figure 3:
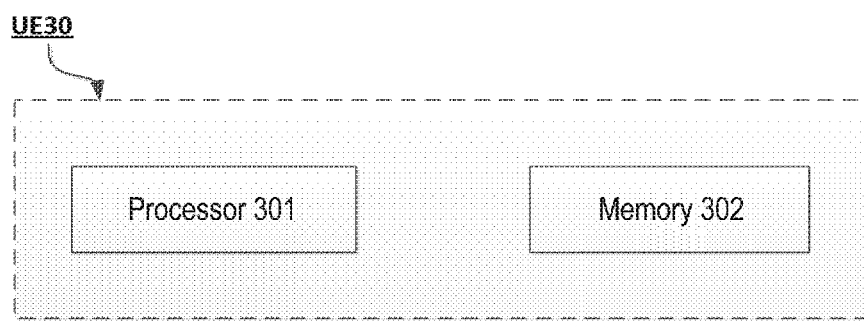
FIG. 3 is a block diagram showing the user equipment (UE) involved in the present invention.

Embodiment 9 of the present invention will be described in detail below. In Embodiment 9, user equipment (UE) of the present invention is described as one example. FIG. 3 is a block diagram showing the user equipment (UE) involved in the present invention. As shown in FIG. 3, the UE 30 includes a processor 301 and a memory 302. The processor 301 may include, for example, a microprocessor, a microcontroller, an embedded processor, and the like. The memory 302 may include, for example, a volatile memory (such as a random access memory (RAM)), a hard disk drive (HDD), a non-volatile memory (such as a flash memory), or other memories. The memory 302 stores program instructions. The instructions, when run by the processor 301, can perform the above control method for user equipment as described in detail in the present invention.

The program running on the device according to the present invention may be a program that enables the computer to implement the functions of the embodiments of the present invention by controlling a central processing unit (CPU). The program or information processed by the program may be temporarily stored in a volatile memory (for example, a random access memory (RAM)), a hard disk drive (HDD), a non-volatile memory (for example, a flash memory), or other memory systems.

The program for implementing the functions of the embodiments of the present invention may be recorded on a computer-readable recording medium. The corresponding functions may be achieved by reading programs recorded on the recording medium and executing them by the computer system. The phrase "computer system" herein may be a computer system embedded in the device, which may include operating systems or hardware (e.g., peripherals).

The phrase "computer-readable recording medium" may refer to a semiconductor recording medium, an optical recording medium, a magnetic recording medium, a recording medium for programs that are dynamically stored for a short time, or any other recording medium readable by a computer.

Various features or functional modules of the device used in the above embodiments may be implemented or executed by circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, controller, microcontroller, or state machine. The circuit may be a digital circuit or an analog circuit. When new integrated circuit technologies that replace existing integrated circuits emerge because of the advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioners, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulting from appropriate combination of the technical means disclosed in the different embodiments are also included within the technical scope of the present invention. In addition, components with the same effect described in the above embodiments may be replaced with one another.

The invention claimed is:

1. A user equipment, comprising:
 a processor; and
 memory in electronic communication with the processor, wherein instructions stored in the memory are executable to:
 associate a value with a priority of a Media Access Control (MAC) Control Element (CE),
 associate a value with a priority of each of several logical channels,
 generate a Sidelink Control Information (SCI) which indicates a resource information of a Physical Sidelink Shared Channel (PSSCH) for a transmission of a MAC Protocol Data Unit (MAC PDU), and
 in a case that the MAC CE and a MAC Service Data Unit (MAC SDU) corresponding to one of the logical channels are included in a MAC PDU,
 set a priority field in the SCI with a value corresponding to the higher priority of the one of the logical channels and the MAC CE.

2. The user equipment according to claim 1, wherein a channel state information (CSI) report is included in the MAC CE.

3. A communication method of a user equipment, comprising:
- associating a value with a priority of a Media Access Control (MAC) Control Element (CE),
- associating a value with a priority of each of several logical channels,
- generating a Sidelink Control Information (SCI) which indicates a resource information of a Physical Sidelink Shared Channel (PSSCH) for a transmission of a MAC Protocol Data Unit (MAC PDU), and
- in a case that the MAC CE and a MAC Service Data Unit (MAC SDU) corresponding to one of the logical channels are included in a MAC PDU,
- setting a priority field in the SCI with a value corresponding to the higher priority of the one of the logical channels and the MAC CE.

* * * * *